United States Patent
Bunker et al.

(10) Patent No.: US 9,957,816 B2
(45) Date of Patent: May 1, 2018

(54) ANGLED IMPINGEMENT INSERT

(71) Applicant: General Electric Company, Schenectady, NY (US)

(72) Inventors: Ronald Scott Bunker, West Chester, OH (US); Jason Randolph Allen, Loveland, OH (US); Ryan Nicholas Porter, Jamestown, OH (US); Byron Andrew Pritchard, Cincinnati, OH (US); Christopher Joseph Greenwell, West Chester, OH (US); Timothy Deryck Stone, West Chester, OH (US); Andrew Stephen Pritchard, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 307 days.

(21) Appl. No.: 14/717,547

(22) Filed: May 20, 2015

(65) Prior Publication Data
US 2015/0345397 A1  Dec. 3, 2015

Related U.S. Application Data

(60) Provisional application No. 62/004,723, filed on May 29, 2014.

(51) Int. Cl.
*F01D 5/18* (2006.01)
*F02C 7/18* (2006.01)
(Continued)

(52) U.S. Cl.
CPC .............. *F01D 5/188* (2013.01); *F01D 5/186* (2013.01); *F01D 5/189* (2013.01); *F01D 9/04* (2013.01);
(Continued)

(58) Field of Classification Search
None
See application file for complete search history.

(56) References Cited

U.S. PATENT DOCUMENTS 4,056,332 A * 11/1977 Meloni ................... F01D 5/188
                                                                415/115
4,293,275 A    10/1981 Kobayashi et al.
(Continued)

FOREIGN PATENT DOCUMENTS

EP    0648979 A1    4/1995
EP    1284338 A2    2/2003
(Continued)

OTHER PUBLICATIONS

PCT Search Report and Written Opinion issued in connection with corresponding PCT Application No. PCT/US2015/032597 dated Feb. 25, 2016.
(Continued)

*Primary Examiner* — Ninh H Nguyen
(74) *Attorney, Agent, or Firm* — General Electric Company; William Scott Andes

(57) ABSTRACT

An engine component with particulate mitigation features is provided. The engine component comprises an internal engine component surface having a cooling flow path on one side thereof and a second component adjacent to the first component. The second component, for example an insert, may have a plurality of openings forming an array wherein the openings extend through the second component at a non-orthogonal angle to the surface of the second component.

29 Claims, 6 Drawing Sheets

(51) Int. Cl.
   *F01D 25/12* (2006.01)
   *F01D 9/04* (2006.01)
   *F23R 3/00* (2006.01)
   *F23R 3/06* (2006.01)

(52) U.S. Cl.
   CPC .............. *F01D 25/12* (2013.01); *F02C 7/18* (2013.01); *F23R 3/005* (2013.01); *F23R 3/06* (2013.01); *F05D 2220/32* (2013.01); *F05D 2240/35* (2013.01); *F05D 2250/38* (2013.01); *F05D 2260/201* (2013.01); *F05D 2260/202* (2013.01); *F23R 2900/03042* (2013.01); *F23R 2900/03044* (2013.01); *Y02T 50/676* (2013.01)

(56) References Cited

U.S. PATENT DOCUMENTS

| | | |
|---|---|---|
| 4,416,585 A | 11/1983 | Abdel-Messeh |
| 4,474,532 A | 10/1984 | Pazder |
| 4,515,526 A | 5/1985 | Levengood |
| 4,775,296 A | 10/1988 | Schwarzmann et al. |
| 5,271,715 A | 12/1993 | Zelesky et al. |
| 5,288,207 A | 2/1994 | Linask |
| 5,353,865 A | 10/1994 | Adiutori et al. |
| 5,395,212 A | 3/1995 | Anzai et al. |
| 5,533,864 A | 7/1996 | Nomoto et al. |
| 5,611,662 A | 3/1997 | Cunha |
| 5,615,546 A | 4/1997 | Althaus et al. |
| 5,681,144 A | 10/1997 | Spring et al. |
| 5,704,763 A | 1/1998 | Lee |
| 6,000,908 A | 12/1999 | Bunker |
| 6,099,251 A | 8/2000 | Lafleur |
| 6,174,134 B1 | 1/2001 | Lee et al. |
| 6,254,346 B1 | 7/2001 | Fukuno et al. |
| 6,290,462 B1 | 9/2001 | Ishiguro et al. |
| 6,331,098 B1 | 12/2001 | Lee |
| 6,406,260 B1 | 6/2002 | Trindade et al. |
| 6,416,283 B1 | 7/2002 | Johnson et al. |
| 6,582,584 B2 | 6/2003 | Lee et al. |
| 6,607,355 B2 | 8/2003 | Cunha et al. |
| 6,609,884 B2 | 8/2003 | Harvey |
| 6,644,921 B2 | 11/2003 | Bunker et al. |
| 6,722,134 B2 | 4/2004 | Bunker |
| 6,837,683 B2 | 1/2005 | Dailey |
| 6,890,154 B2 | 5/2005 | Cunha |
| 6,905,301 B2 | 6/2005 | Tiemann |
| 6,916,150 B2 | 7/2005 | Liang |
| 6,932,573 B2 | 8/2005 | Liang |
| 6,939,102 B2 | 9/2005 | Liang |
| 6,981,846 B2 | 1/2006 | Liang |
| 6,984,102 B2 | 1/2006 | Bunker et al. |
| 7,094,031 B2 | 8/2006 | Lee et al. |
| 7,104,757 B2 | 9/2006 | Gross |
| 7,128,533 B2 | 10/2006 | Liang |
| 7,137,781 B2 | 11/2006 | Harvey et al. |
| 7,186,084 B2 | 3/2007 | Bunker et al. |
| 7,195,458 B2 | 3/2007 | Liang |
| 7,300,242 B2 | 11/2007 | Liang |
| 7,399,160 B2 | 7/2008 | Harvey et al. |
| 7,413,407 B2 | 8/2008 | Liang |
| 7,445,432 B2 | 11/2008 | Levine et al. |
| 7,520,723 B2 | 4/2009 | Liang |
| 7,534,089 B2 | 5/2009 | Liang |
| 7,547,191 B2 | 6/2009 | Liang |
| 7,637,720 B1 | 12/2009 | Liang |
| 7,665,965 B1 | 2/2010 | Liang |
| 7,690,892 B1 | 4/2010 | Liang |
| 7,699,583 B2 | 4/2010 | Cunha |
| 7,713,026 B1 | 5/2010 | Liang |
| 7,722,327 B1 | 5/2010 | Liang |
| 7,766,616 B2 | 8/2010 | Baldauf et al. |
| 7,806,658 B2 | 10/2010 | Liang et al. |
| 7,824,156 B2 | 11/2010 | Dellmann et al. |
| 7,866,948 B1 | 1/2011 | Liang |
| 7,938,624 B2 | 5/2011 | Tibbott |
| 7,985,050 B1 | 7/2011 | Liang |
| 8,297,926 B2 | 10/2012 | Grobeta |
| 8,408,872 B2 | 4/2013 | Briggs et al. |
| 8,439,639 B2 | 5/2013 | Joe et al. |
| 9,249,679 B2 * | 2/2016 | Berkebile ............. F23R 3/06 |
| 2004/0009066 A1 * | 1/2004 | Soechting ............. F01D 5/186 416/96 R |
| 2006/0099073 A1 | 5/2006 | Djeridane et al. |
| 2007/0243065 A1 | 10/2007 | Devore et al. |
| 2007/0297916 A1 | 12/2007 | Levine et al. |
| 2007/0297917 A1 | 12/2007 | Levine et al. |
| 2008/0115506 A1 | 5/2008 | Patel et al. |
| 2008/0131262 A1 | 6/2008 | Lee et al. |
| 2009/0087312 A1 | 4/2009 | Bunker et al. |
| 2010/0040480 A1 | 2/2010 | Webster et al. |
| 2010/0221121 A1 | 9/2010 | Liang |
| 2010/0226761 A1 | 9/2010 | Liang |
| 2010/0226791 A1 | 9/2010 | Fujimura et al. |
| 2010/0247328 A1 | 9/2010 | Cunha |
| 2010/0303635 A1 | 12/2010 | Townes et al. |
| 2011/0027102 A1 | 2/2011 | Nakamata et al. |
| 2011/0038709 A1 | 2/2011 | Liang et al. |
| 2011/0164960 A1 | 7/2011 | Maldonado |
| 2011/0188993 A1 * | 8/2011 | Bacha .................. F01D 11/24 415/115 |
| 2012/0177478 A1 | 7/2012 | Giri et al. |
| 2013/0081401 A1 | 4/2013 | Kim |
| 2014/0109577 A1 | 4/2014 | Lee et al. |
| 2015/0345397 A1 * | 12/2015 | Bunker ................. F02C 7/18 416/95 |
| 2016/0333735 A1 * | 11/2016 | Bunker ................. F23R 3/005 |

FOREIGN PATENT DOCUMENTS

| | | |
|---|---|---|
| EP | 2087206 B1 | 3/2010 |
| EP | 2172708 A2 | 4/2010 |
| EP | 2235328 A1 | 10/2010 |
| EP | 2505787 A1 | 10/2012 |
| EP | 2538137 A2 | 12/2012 |
| EP | 2549188 A2 | 1/2013 |
| EP | 2573464 A2 | 3/2013 |
| EP | 2700877 A2 | 2/2014 |
| EP | 2778369 A1 | 9/2014 |
| JP | 03182602 A | 8/1991 |
| JP | 08338202 A | 12/1996 |
| JP | 3040590 B2 | 5/2000 |
| JP | 3124109 B2 | 1/2001 |
| JP | 3586637 B2 | 11/2004 |
| WO | 2011156078 A1 | 12/2011 |
| WO | 2013123115 A1 | 8/2013 |

OTHER PUBLICATIONS

PCT Search Report and Written Opinion issued in connection with Related Application No. PCT/US2015/057708 dated Jun. 17, 2016.
European Search Report and Opinion issued in connection with related EP Application No. 15168849.6 dated Oct. 28, 2015.
European Search Report and Opinion issued in connection with corresponding EP Application No. 15169174.8 dated Oct. 28, 2015.
PCT Search Report and Written Opinion issued in connection with related Application No. PCT/US2015/032592 dated Oct. 29, 2015.
PCT Search Report and Written Opinion issued in connection with related Application No. PCT/US2015/057577 dated Jan. 14, 2016.

* cited by examiner

ANGLED IMPINGEMENT INSERT

CROSS-REFERENCE TO RELATED APPLICATIONS

This non-provisional application claims the benefit of priority under 35 U.S.C. § 119(e) to U.S. Provisional Patent Application No. 62/004,723, entitled "ANGLED IMPINGEMENT INSERT FOR PARTICULATE ACCUMULATION MITIGATION", filed May 29, 2014, which is herein incorporated in its entirety by reference.

BACKGROUND

The technology described herein relates to angled impingement openings for reducing or mitigating particulate accumulation. More specifically, present embodiments relate to, without limitation, an array of openings disposed at an angle to a surface to provide angled flow and reduce particulate accumulation on part surfaces and improve cooling effectiveness.

Most operating environments of a gas turbine engine receive particulate material into the engine. Such particulate can have various detrimental effects in the engine.

The accumulation of dust, dirt or other particulate matter in gas turbine engines or turbo-machinery reduces the efficiency of the machinery, as well as reducing the effectiveness of the cooling which occurs within the engine. The particulate may insulate components of the engine which lead to the increasing component temperature therein. Particulate can also block or plug apertures utilized for cooling components within the engine which further leads to decreased functionality or effectiveness of the cooling circuits within the engine components or hardware.

Accumulation of particulate is in part due to stagnation and/or recirculation of air flow within cooling circuits. Prior efforts to resolve particulate accumulation problems have included additional flow through the engine components so as to increase surface cooling. This has deemphasized internal cooling feature effectiveness but utilizes more compressed air which would alternatively be directed into the core for improving performance and output of the gas turbine engine.

It would be desirable to reduce or eliminate the factors leading to the increased temperature or decreased cooling effectiveness of the engine components. It would further be desirable to decrease the amount of particulate accumulation and decrease stagnation or low momentum of air flow so that particulate does not accumulate in the aircraft engine.

BRIEF DESCRIPTION

According to some embodiments, an engine component with particulate mitigation features is provided. The engine component comprises an internal engine component surface having a cooling flow path on one side thereof and a second component adjacent to the first component. The second component, for example an insert, may have a plurality of openings forming an array wherein the openings extend through the second component at a non-orthogonal angle to the surface of the second component. The second component having the angled openings reduces stagnation and flow recirculation regions along the surface of the first engine component to mitigate particulate accumulation within the first component of the gas turbine engine.

According to some embodiments, an engine component assembly for impingement cooling comprises an engine component having a cooled surface, the engine component having a cooling flow path on one side of the cooled surface, an insert adjacent to the engine component cooled surface, the insert having a plurality of openings forming an array through the insert, the cooling flow path passing through the plurality of openings to cool said cooled surface, a gap between the engine component and the insert and the plurality of openings extending through the insert at a non-orthogonal angle to a surface of the insert.

BRIEF DESCRIPTION OF THE DRAWINGS

The above-mentioned and other features and advantages of these exemplary embodiments, and the manner of attaining them, will become more apparent and the methods and material for forming an angled impingement insert for mitigating particulate (including dust) accumulation will be better understood by reference to the following description of embodiments taken in conjunction with the accompanying drawings, wherein.

DETAILED DESCRIPTION

Figure 1:
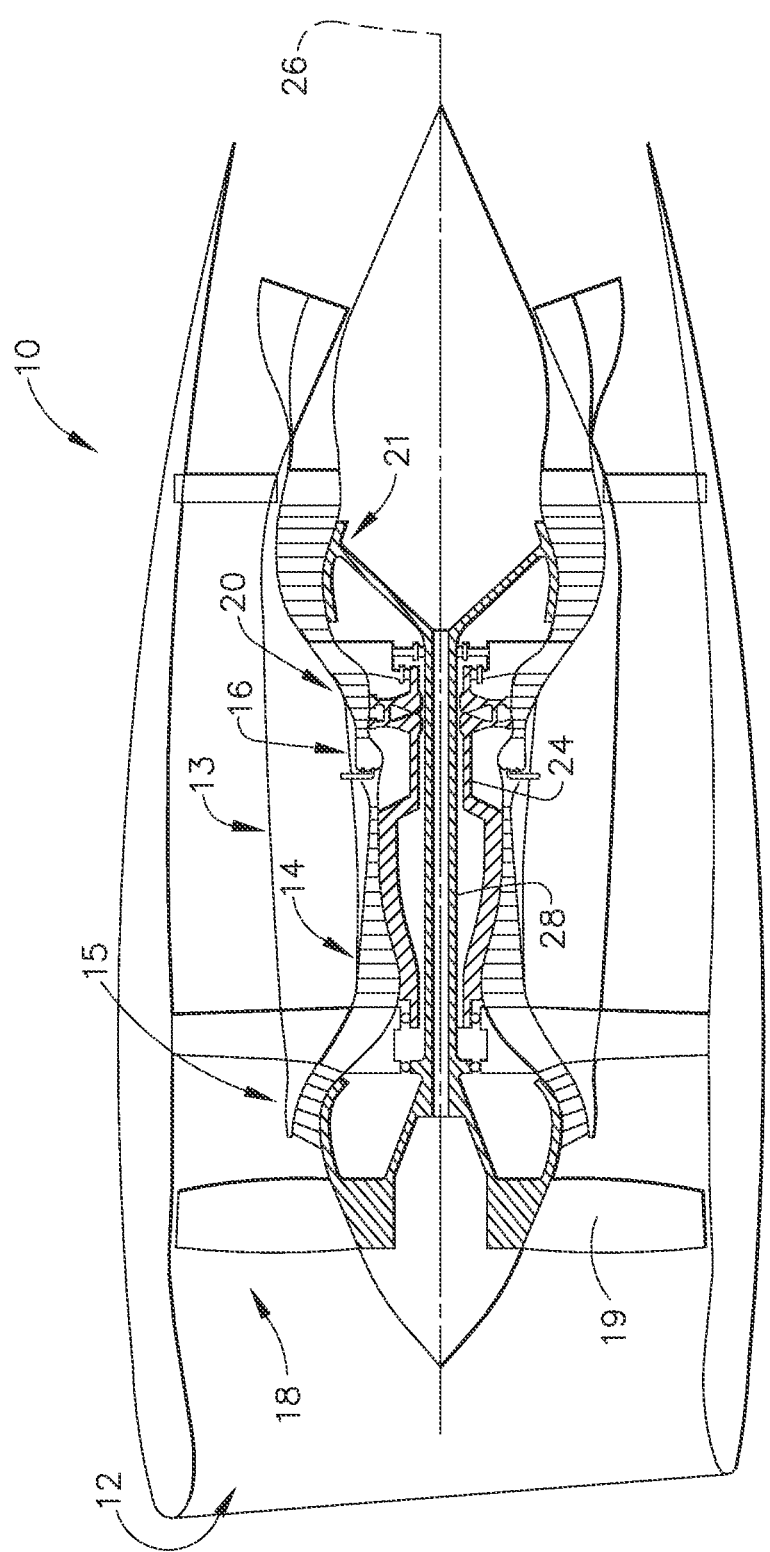
FIG. 1 is a side section view of an exemplary gas turbine engine.

Reference now will be made in detail to embodiments provided, one or more examples of which are illustrated in the drawings. Each example is provided by way of explanation, not limitation of the disclosed embodiments. In fact, it will be apparent to those skilled in the art that various modifications and variations can be made in the present embodiments without departing from the scope or spirit of the disclosure. For instance, features illustrated or described as part of one embodiment can be used with another embodiment to still yield further embodiments. Thus it is intended to include such modifications and variations as come within the scope of the appended claims and their equivalents.

Referring now to FIGS. 1-9, various views are depicted which teach impingement inserts which reduce stagnation regions and therefore, particulate accumulation or build-up within an engine component. As a result, engine cooling may be improved. Present embodiments relate to gas turbine engine components which utilize an insert to provide cooling air along a cool side surface of an engine component. The insert provides an array of cooling holes or apertures which are facing the cool side surface of the engine component and direct cooling air onto that cool side surface. The apertures may be formed in arrays and are directed at an oblique angle or a non-orthogonal angle to the surface of the insert and further may be at an angle to the surface of the engine component being cooled. As a result, particulate accumulation within the engine component may be reduced.

The present embodiments may be applied to first stage and second stage nozzles for example, as well as shroud hanger assemblies or other components or combinations that utilize impingement cooling and/or are susceptible to particulate build-up resulting in reduced cooling capacity, including but not limited to combustor liners, combustor deflectors and transition pieces. Various combinations of the depicted embodiments may be utilized to form the particulate accumulation mitigation features described further herein.

As used herein, the terms "axial" or "axially" refer to a dimension along a longitudinal axis of an engine. The term "forward" used in conjunction with "axial" or "axially" refers to moving in a direction toward the engine inlet, or a component being relatively closer to the engine inlet as compared to another component. The term "aft" used in conjunction with "axial" or "axially" refers to a direction toward the rear or outlet of the engine relative to the engine center line.

As used herein, the terms "radial" or "radially" refer to a dimension extending between a center longitudinal axis of the engine and an outer engine circumference. The use of the terms "proximal" or "proximally," either by themselves or in conjunction with the terms "radial" or "radially," refers to moving in a direction toward the center longitudinal axis, or a component being relatively closer to the center longitudinal axis as compared to another component. The use of the terms "distal" or "distally," either by themselves or in conjunction with the terms "radial" or "radially," refers to moving in a direction toward the outer engine circumference, or a component being relatively closer to the outer engine circumference as compared to another component.

As used herein, the terms "lateral" or "laterally" refer to a dimension that is perpendicular to both the axial and radial dimensions.

All directional references (e.g., radial, axial, proximal, distal, upper, lower, upward, downward, left, right, lateral, front, back, top, bottom, above, below, vertical, horizontal, clockwise, counterclockwise) are only used for identification purposes to aid the reader's understanding of the present invention, and do not create limitations, particularly as to the position, orientation, or use of the invention. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. The exemplary drawings are for purposes of illustration only and the dimensions, positions, order and relative sizes reflected in the drawings attached hereto may vary.

Referring initially to FIG. 1, a schematic side section view of a gas turbine engine 10 is shown having an engine inlet end 12 wherein air enters a propulsor 13, which is defined generally by a multi-stage compressor, including for example a low pressure compressor 15 and a high pressure compressor 14, a combustor 16 and a multi-stage turbine, including for example a high pressure turbine 20 and a low pressure turbine 21. Collectively, the propulsor 13 provides power during operation. The gas turbine engine 10 may be used for aviation, power generation, industrial, marine service or the like. The gas turbine engine 10 is axis-symmetrical about engine axis 26 so that various engine components rotate thereabout. In operation, air enters through the air inlet end 12 of the engine 10 and moves through at least one stage of compression where the air pressure is increased and directed to the combustor 16. The compressed air is mixed with fuel and burned providing the hot combustion gas which exits the combustor 16 toward the high pressure turbine 20. At the high pressure turbine 20, energy is extracted from the hot combustion gas causing rotation of turbine blades which in turn cause rotation of a shaft 24.

The engine 10 includes two shafts 24, 28. The axis-symmetrical shaft 24 extends through the turbine engine 10, from the forward end to an aft end for rotation of one or more high pressure compressor stages 14. The shaft 24 is supported by bearings along its length. The shaft 24 may be hollow to allow rotation of the second shaft 28, a low pressure turbine shaft therein. The shaft 28 extends between the low pressure turbine 21 and a low pressure compressor 15. Both shafts 24, 28 may rotate about the centerline axis 26 of the engine. During operation the shafts 24, 28 rotate along with other structures connected to the shafts such as the rotor assemblies of the turbine 20, 21, compressor 14, 15 and fan 18 in order to create power or thrust depending on the area of use, for example power, industrial or aviation.

Referring still to FIG. 1, the inlet 12 includes a turbofan 18 which includes a circumferential array of exemplary blades 19 extending radially outward from the root. The turbofan 18 is operably connected by the shaft 28 to the low pressure turbine 21 and creates thrust for the turbine engine 10.

Within the turbine areas 20, 21 are airfoils which are exposed to extremely high temperature operating conditions. It is desirable to increase temperatures in these areas of the gas turbine engine as it is believed such increase results in higher operating efficiency. However, this desire to operate at high temperatures is bounded by material limitations in this area of the engine. Turbine components are cooled to manage these material limits. For example, shrouds adjacent to rotating blades of the turbine or compressor may require cooling. Additionally, nozzles which are axially adjacent to the rotating blades may also require cooling. Still further, the combustor structures which hold the flame and combustion product gases may be cooled with impingement cooling. These components are collectively referred to as first engine components.

Figure 2:
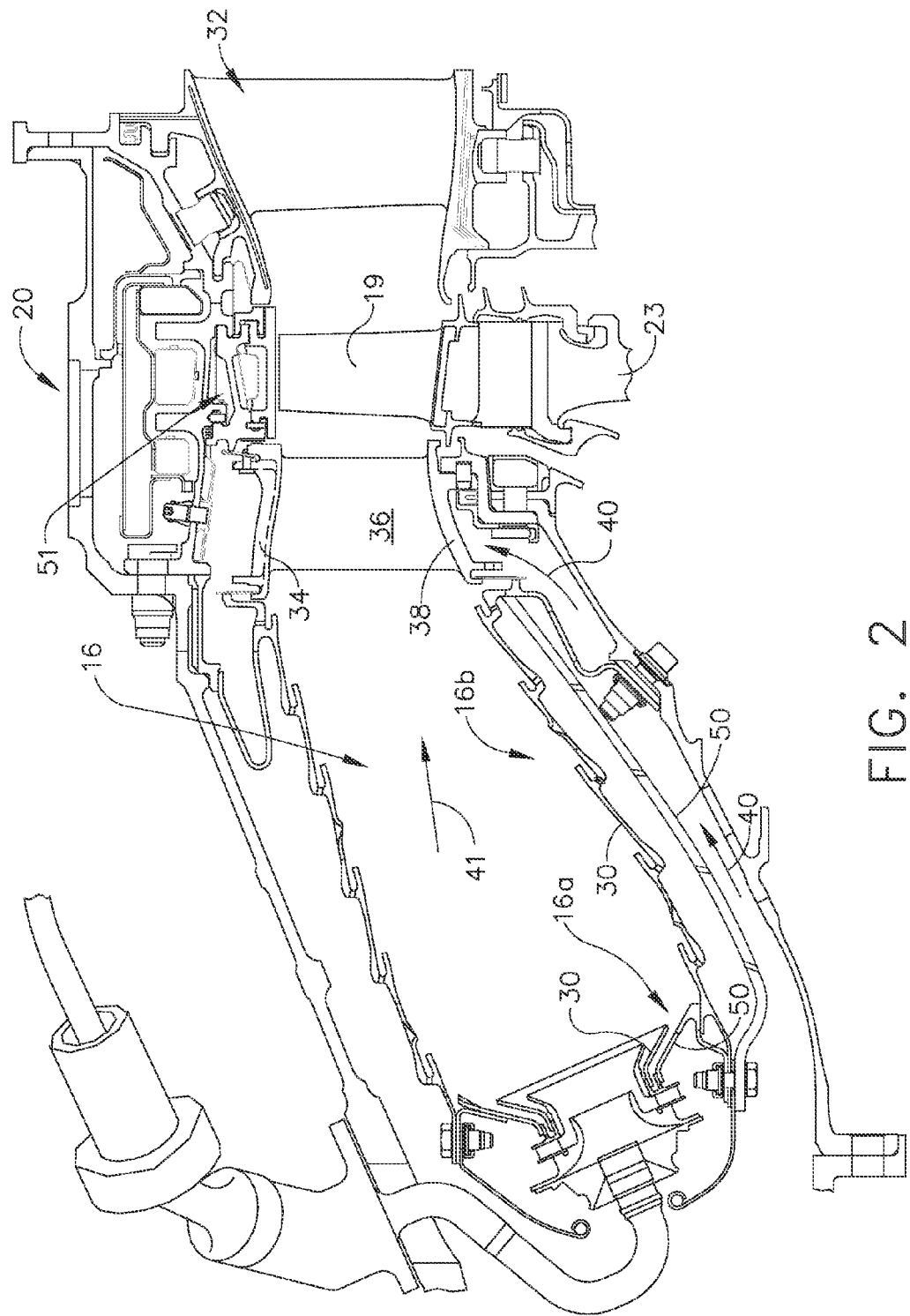
FIG. 2 is a side section view of a portion of the propulsor including a turbine and combustor.

Referring now to FIG. 2, a side section view of a combustor 16 and high pressure turbine 20 is depicted. The combustor 16 is shown having various locations wherein impingement embodiments may be utilized. For example, one skilled in the art will realize upon review of this disclosure that the impingement embodiments defined by first and second components may be used in the area of the deflector 16a or the combustor liner 16b.

The turbine 20 includes a number of blades 19 which are connected to a rotor disc 23 which rotates about the engine center line 26 (FIG. 1). Adjacent to the turbine blades 19 in the axial direction, the first engine component may be embodied by the first stage nozzle 30 which is adjacent to the rotating blade 19 of turbine 20. The turbine 20 further comprises a second stage nozzle 32 aft of the blade 19. The second stage nozzle 32 may also embody the first engine component 30 as described further herein. The nozzles 30, 32 turn combustion gas for delivery of the hot working fluid to the turbine to maximize work extracted by the turbine 20, 21. The nozzle 30 includes an outer band 34, an inner band 38 and an airfoil 36. A cooling flow circuit or flow path 40 passes through the airfoil 36 to cool the airfoil as combustion gas 41 passes along the exterior of the nozzle 30. One area within a gas turbine engine where dust accumulation occurs is within the nozzle 30, 32 of the turbine 20. The internal cooling circuit 40 which reduces temperature of the components can accumulate particulate and decrease cooling. The exemplary nozzle 32 may acquire dust accumulation and therefore mitigation features described further herein may be utilized in a high pressure turbine stage one nozzle 30 or stage two nozzle 32. However, this is non-limiting and the features described may be utilized in other locations as will be discussed further. Additionally, as described further, shroud assembly 51 may require cooling due to the turbine operating conditions.

Figure 3:
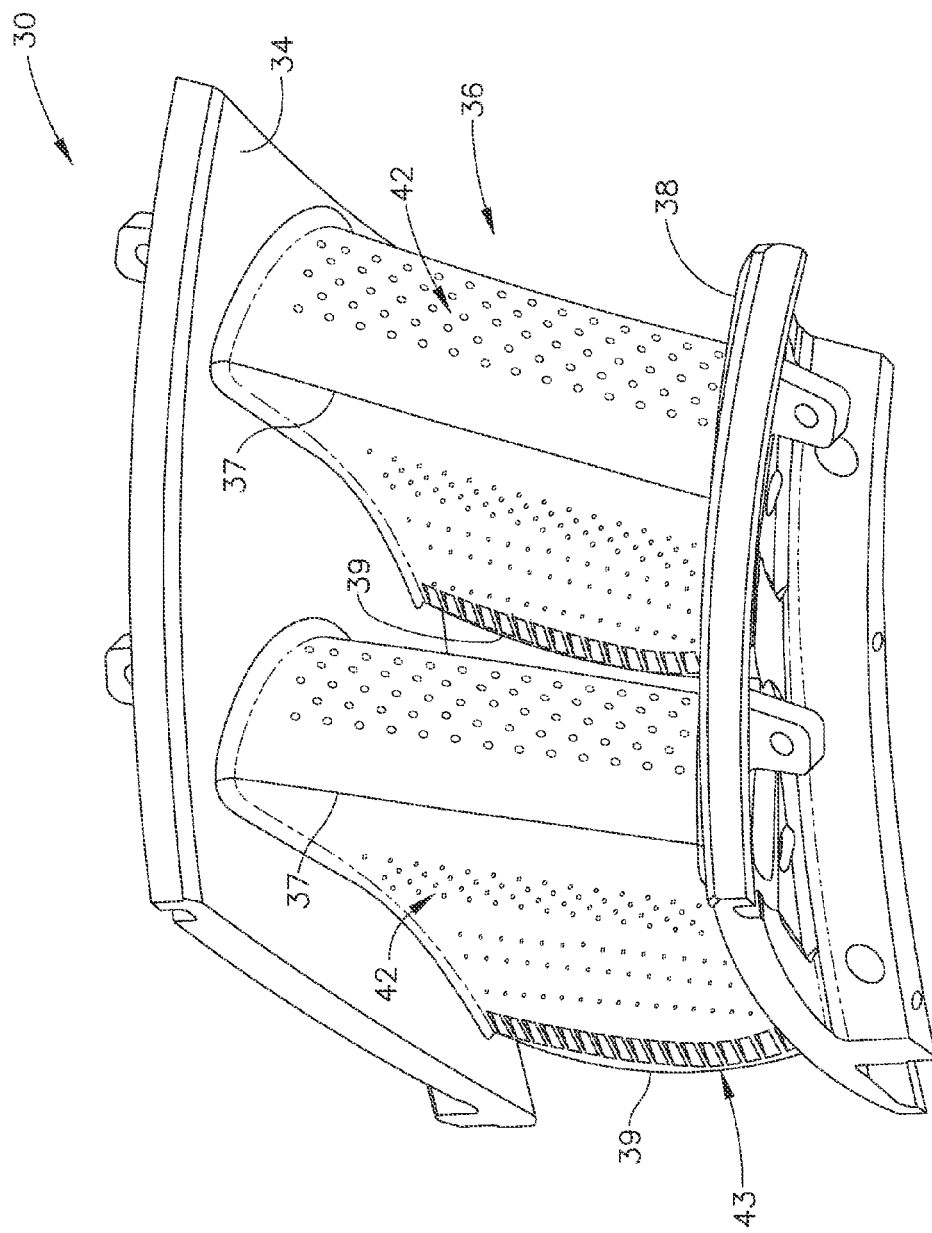
FIG. 3 is an isometric view of an exemplary nozzle utilized in the turbine.

Referring now to FIG. 3, an isometric view of an exemplary nozzle 30 is depicted. The nozzle includes the outer band 34 and the inner band 38, between which an airfoil 36 is located. The airfoil 36 may be completely or at least partially hollow and provide the air flow path or circuit 40 (FIG. 2) through such hollow portion of the airfoil. The airfoil 36 includes a leading edge 37, a trailing edge 39 and a radially outer end and radially inner end. The outer surface of the nozzle receives combustion gas 41 (FIG. 2) from the combustor 16 (FIG. 1). The inner surface of the airfoil 36 is cooled by the cooling flow path 40 to maintain structural integrity of the nozzle 30 which may otherwise be compromised by the high heat in the turbine 20. The outer band 34 and inner band 38 are located at the outer end and inner end of the airfoil, respectively.

The exterior of the airfoils 36 may be formed with a plurality of cooling film holes 42 which form a cooling film over some or all of the airfoil 36. Additionally, the airfoil 36 may include apertures 43 at the trailing edge 39.

Figure 4:
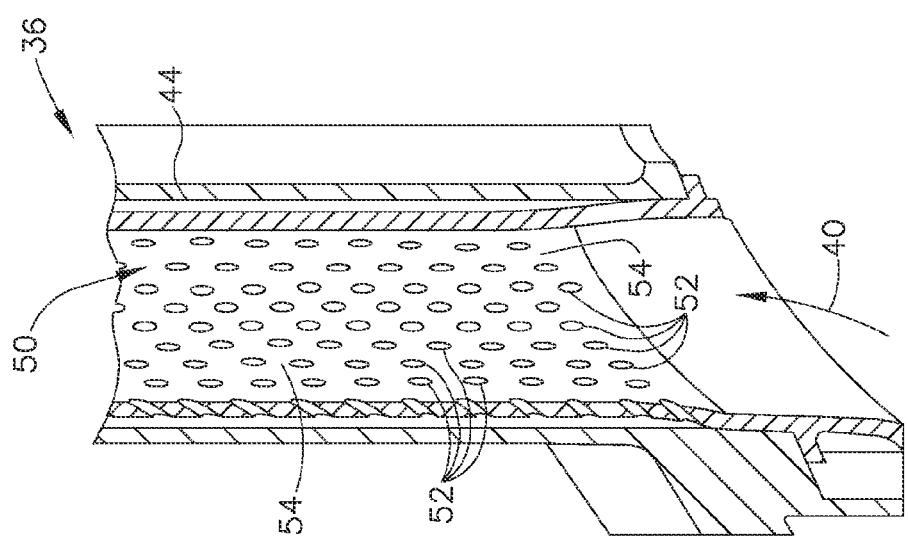
FIG. 4 is a partial section view of an exemplary nozzle.

Referring now to FIG. 4, a partial section view of the nozzle 30 is depicted through a radial section to depict the interior area of the airfoil 36. In this view, the inner or cooling surface of the airfoil 36 is shown. The inner surface 44 is disposed adjacent to the cooling flow path 40. As used with respect to the cooling flow path, the term "adjacent" may mean directly near to or indirectly near to. Within the airfoil 36 is an insert 50 which receives air flow 40 through the hollow space of the airfoil 36 and directs the air flow outwardly to an interior surface of the airfoil 36. An insert 50 may be inserted inside another component, or being inserted between two parts. The insert 50 is made with multiple cooling holes or apertures 52 that allow fluid to flow through the insert 50. Further, the inserts 50 may be generally sealed around a perimeter to the part being cooled, and therefore, all of the fluid flows through the holes and none goes around the insert. Alternatively, the insert 50 may not be completely sealed and therefore allows some preselected amount of cooling flow path 40 air to bypass the impingement holes 52. The insert flow area and pressure ratio is such that the fluid is accelerated through each impingement cooling hole or aperture 52 to form a cooling impingement jet. The insert 50 is disposed adjacent to the cooling flow path 40, between the cooling flow path 40 and the interior airfoil surface 44 according to one embodiment. The insert 50 includes a plurality of cooling holes or openings 52. The insert 50 directs such cooling air to the airfoil 36 by way of the plurality of openings or cooling holes 52 located within the insert 50. The openings 52 define at least one array 54. The term "array" is utilized to include a plurality of openings which may be spaced both uniformly from one another and non-uniformly at varying distances. An array 54 of holes or apertures formed in an insert 50 is present if in at least the two-dimensional case, e.g. a plane, it requires both X and Y coordinates in a Cartesian system to fully define and locate the hole placements with respect to one another. Thus, an array requires the relative spacing in both dimensions X and Y. This plane example could then be understood as applying also to curved inserts as the array is located on the surface curvature. A grouping of holes or apertures would then comprise any array or a portion of an array, especially if the spacings, hole diameters, orientations, and angles are changing from one hole to another, from one row of holes to another, or even from one group of holes to another. A pattern ensues when the same qualifiers are repeated over a number of holes, rows, or groups. Additionally, the arrays 54 may be arranged in groups or patterns wherein the patterns are either uniformly spaced or non-uniformly spaced apart.

Each of the openings 52 extends through the insert 50 at a preselected angle. The angle of each cooling opening may be the same or may vary and may further be within a preselected range as opposed to a specific angle. For example, the angle may be less than 90 degrees. The openings may be in the same or differing directions. The insert 50 directs the cooling air to the cold surface of the airfoil 36, that is the interior surface 44 for example, which is opposite the combustion gas or high temperature gas path 41 traveling along the exterior of the nozzle 30 and airfoil 36.

Figure 7:
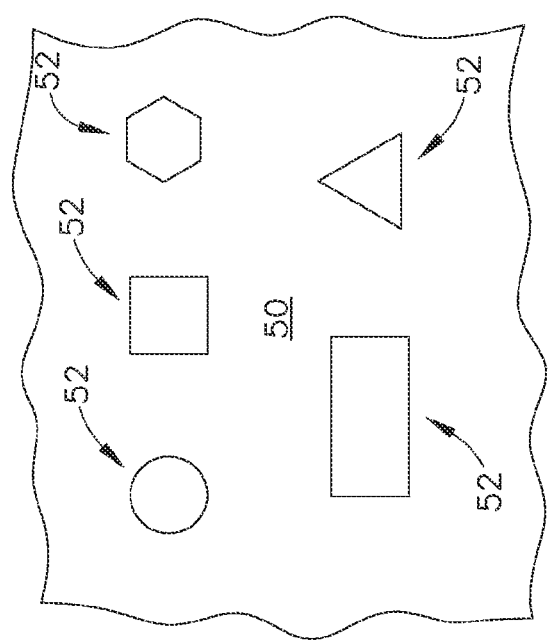
FIG. 7 is a view of various cross-sections of cooling hole openings which may be used with instant embodiments.

Further, the apertures 52 may be formed in a plurality of shapes and sizes. For example any or various closed boundary shapes may be utilized, including but not limited to circular, oblong, polygon. By polygon, any shape having at least three sides and three angles may be utilized. Further, the angles may include radiuses or fillets. According to some embodiments, the apertures are all of a single size. According to other embodiments, the apertures 52 may be of differing sizes. Further, the cross-sectional shapes of the apertures may all be of a single shape or vary in shape. As shown in FIG. 7, a plurality of cross-sectional shapes is shown as exemplary apertures 52 which may be utilized. The sizes and shapes may be tuned to provide the desired cooling or the desired air flow usage through the insert to the inside or cold surface of the airfoil. By tuned, it is meant that the sizes and/or shapes may be varied to obtain a desired cooling and/or reduction of particulate build up.

Figure 5:
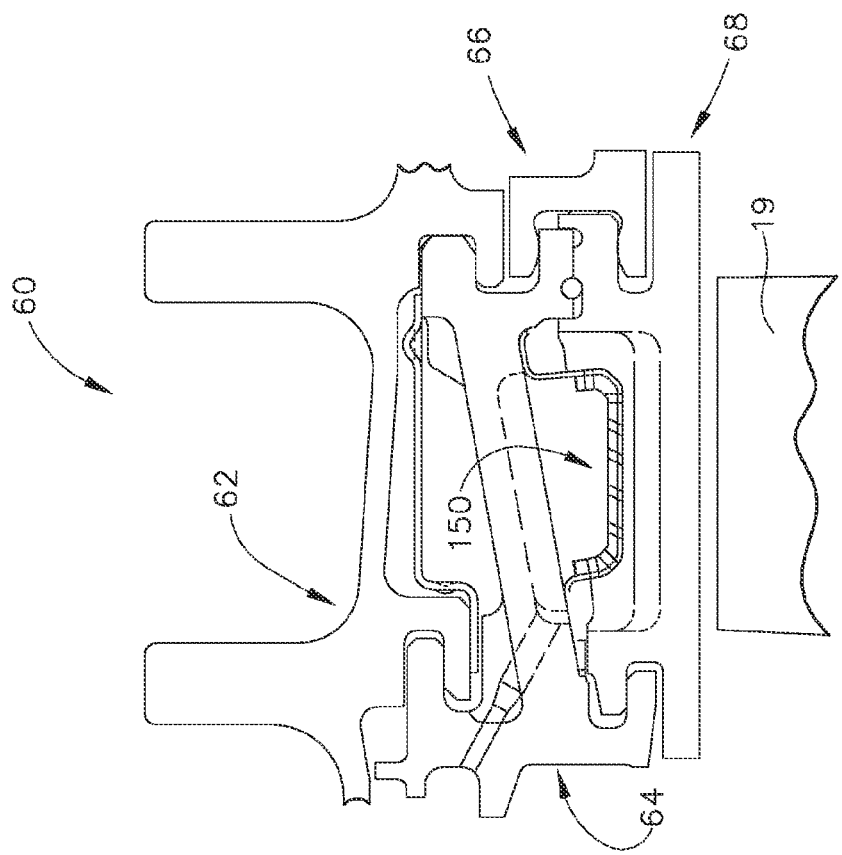
FIG. 5 is a side section view of an alternative embodiment of the angled impingement structure.

According to the embodiments shown in FIG. 5, an alternate utilization of the exemplary dust mitigation structure is provided. According to this exemplary embodiment, a shroud hanger assembly 60 is shown having an interior insert 150 which cools a cold side of a shroud by way of impingement cooling. The shroud hanger assembly 60 comprises a hanger 62 that includes a first hanger portion 64 and a second hanger portion 66. The hanger portions 64, 66 retain a shroud 150 in position, adjacent to which a blade 19 rotates. It is desirable to utilize cooling fluid moving within or defining the cooling flow path or circuit to reduce the temperature of the insert 150 by way of impingement cooling. However, it is known for prior art shroud hanger assemblies to incur dust accumulation within this insert area and on the cooling surface of the shroud 68 which over time reduces cooling capacity of the cooling fluid. According to the instant embodiments, the insert 150 may include the plurality of apertures which are angled or non-orthogonal to the surface of the insert and surface of the shroud. In this embodiment, the array 54 of apertures 52 are angled relative to the surface of the insert and the opposite surface of the shroud to limit dust accumulation in this area of the gas turbine engine.

Figure 6:
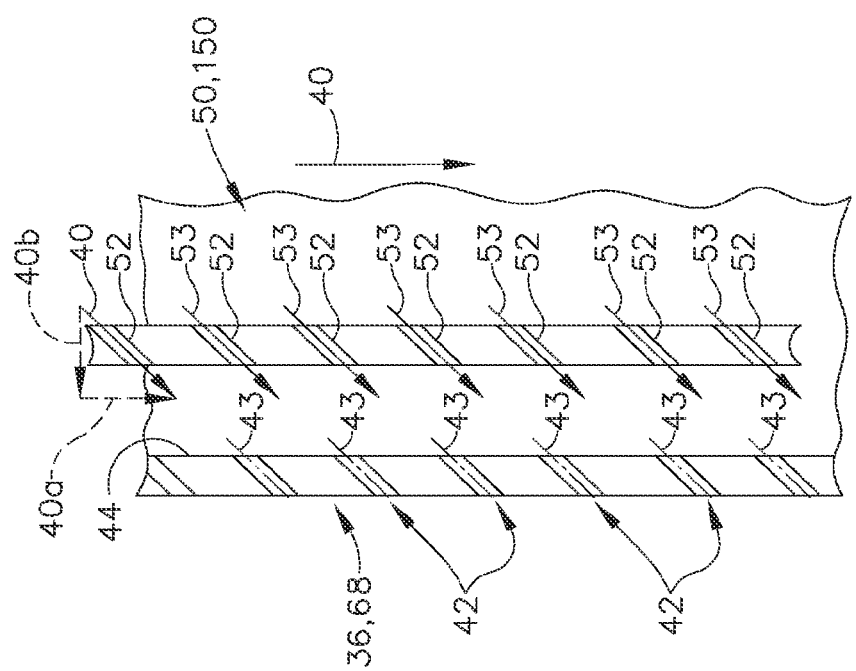
FIG. 6 is a schematic view of the angled impingement of a second component on a first component.

Referring now to FIG. 6, a schematic view of the angled impingement configuration is depicted. The first engine component 30 may be the airfoil nozzle 36 or shroud 68 according to some embodiments. The insert 50, 150 may be the second engine component. The angle of the aperture 52 is defined by an axis 53 extending through the aperture 52. The axis 53 may be angled with the inner or cooled surface 44 or may be aligned or may be unaligned with film holes 42. The holes 42 and cooling aperture 52 may be aligned where the axis 53 of the cooling aperture passes through the cooling film hole 42 or crosses the axis 43 of the cooling film hole at or near the cooling film hole. Alternatively, the axis 53 may not be aligned with the cooling holes 42 so as to impinge the surface 44.

Additionally shown in this view, the relationship of aperture length to diameter ratio may be discussed. The insert 50 may have thickness generally in a horizontal direction for purpose of the description and exemplary depiction. It has been determined that increasing the thickness of the insert may improve the desirable aperture length-to-diameter ratio which will improve performance. Conventional inserts have aperture length-to-diameter ratios generally of less than 1. For the purpose of generating and forming a fluid jet that has a well-defined core region with minimal lateral spreading, the length-to-diameter ratios of angled apertures are desired to be in the range of 1 to 10, and more specifically in the range of 1 to 5. To comply with other desirable engine metrics such as weight and aperture, length-to-diameter ratios in the range of 1 to 2.5 are frequently more desirable. The length that is used in this length-to-diameter ratio is defined as the portion of the aperture centerline axis that maintains a complete perimeter for the cross-section taken perpendicular to the axis. Further, the thickness of the insert 50 may be constant or may vary. Still further, it will be understood by one skilled in the art that the aperture cross-section may change in area as a function of its length while keeping the same basic shape, i.e. it may expand or contract. Accordingly, the aperture axis may define a somewhat or slightly arcuate line, not necessarily a perfectly straight line.

The cooling fluid or cooling air flow 40 is shown on a side of the airfoil 36 and also adjacent to the insert 50, 150. The insert 50 includes an array defined by the plurality of apertures 52 located in the insert and which direct the air outwardly at an angle relative to the inside surface of the component 50, 150. The nozzle 30 may also comprise a plurality of cooling holes 42 which may be at an angle to the surface as depicted but may be at any angle to the nozzle surface. With this embodiment, as with the previous embodiment, the array of cooling openings 52 may be of various sizes and shapes wherein the apertures may be uniformly spaced or may be non-uniformly spaced and further wherein the pattern or arrays may be uniformly spaced or non-uniformly spaced apart. The cooling apertures 52 may also be of one uniform cross-sectional shape or of varying cross-sectional shapes and further, may be of uniform size or varying size or formed in a range of sizes.

Also shown in FIG. 6, is the passage of the cooling air 40 through one of the apertures 52. This is shown only at one location for sake of clarity. The flow of cooling fluid 40 is made up of two components. The first axial component 40a may be an average fluid velocity tangent to the cooled surface 44. The second radial component 40b may be an average fluid velocity normal to the cooled surface 44. These two components 40a, 40b are not shown to scale but define the vector of the cooling fluid 40 exiting the cooling apertures 52. The components 40a, 40b may also define a ratio which may be between 0 and 2. According to some embodiments, the ratio may be between 0.3 and 1.5. According to still further embodiments, the ratio may be between 0.5 and 1.

Additionally, it should be understood by one skilled in the art that the cooling apertures 52, 152 or others described may be aimed in three dimensions although only shown in the two dimensional figures. For example, a cooling aperture 52 or any other embodiment in the disclosure may have an axis 53 which generally represents the cooling flow 40 passing through the aperture. The axis 53 or vector of the cooling flow 40 through the aperture 52 may be defined by at least two components, for example a radial component (40b) and at least one of a circumferential or axial component (40a). The vector may be aimed additionally by varying direction through the third dimension, that is the other of the circumferential or axial dimension, some preselected angular distance in order to provide aiming at a desired location on the surface of the opposed engine component, or a specific cooling feature as discussed further herein. In the depicted embodiment, the third dimension, for example the circumferential dimension, may be into or out of the page.

Figure 8:
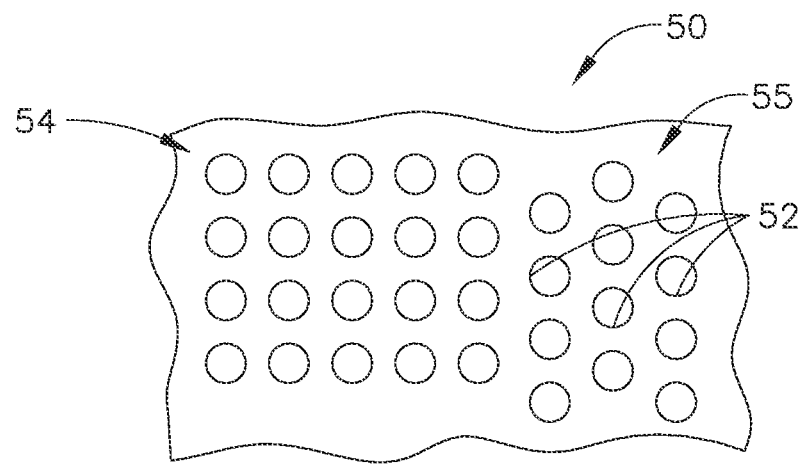
FIG. 8 is a view of an array including uniformly spaced apertures which may or may not be staggered; and, FIG. 9 is a view of an array including non-uniformly spaced apertures.

Referring now to FIG. 8, a view of an exemplary second component surface is depicted, for example component 50 or 150. The surface includes an array 54 of apertures 52. The array 54 may be formed of rows of apertures 52 extending in first and second directions. According to one embodiment, the array 54 is shown having a uniform spacing of apertures 52. The apertures 52 in one direction, for example, the left to right direction shown, may be aligned or alternatively may be staggered so that holes in every other row are aligned. The staggering may occur in a second direction, such as a direction perpendicular to the first direction. A plurality of these arrays 54 may be utilized on the insert 50 or a mixture of arrays 54 with uniform size and/or shape may be utilized. A single array may be formed or alternatively, or a plurality of smaller arrays may be utilized along the part. In the instant embodiment, one array 54 is shown with uniform spacing and hole size and shape, on the left side of the figure. On the right side of the figure a second array 55 is shown with apertures 52 of uniform spacing, size and shape, but the rows defining the array 55 are staggered or offset.

Figure 9:
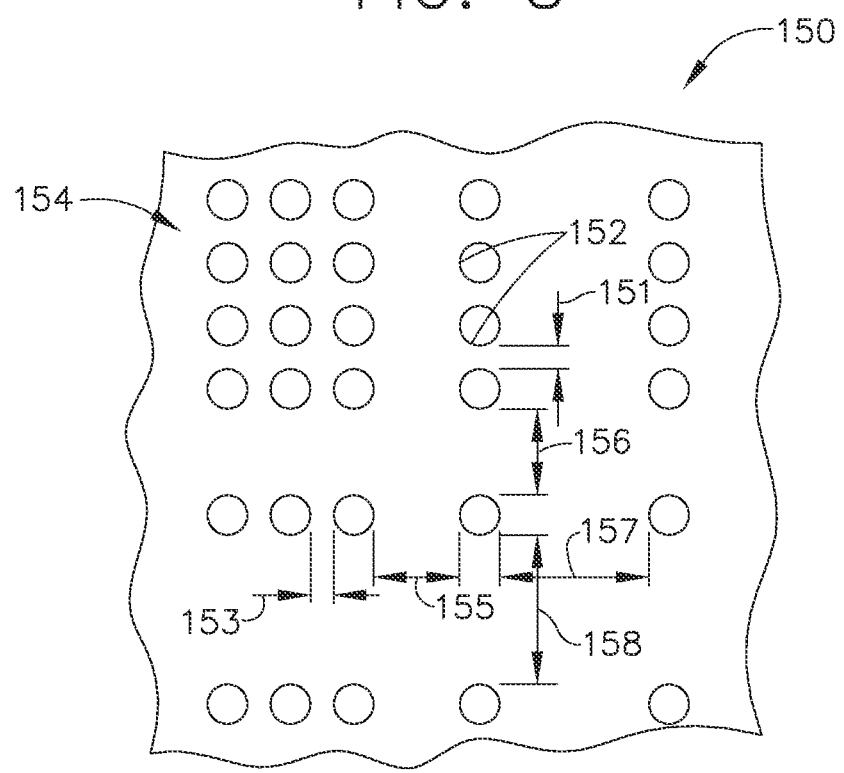

With reference to FIG. 9, a plurality of arrays is again shown. However, in this embodiment the arrays 154 are non-uniformly spaced apart and additionally, the apertures 52 may be non-uniformly spaced apart. Such spacing may be dependent upon locations where cooling is more desirable as opposed to utilizing a uniformly spaced array which provides generally equivalent cooling at all locations.

The array 154 has a first plurality of apertures 152 which are spaced apart a first distance 153. The apertures 152 are additionally shown spaced apart a second distance 155 which is greater than distance 153. The apertures 152 have a further spacing distance 157 which is greater than spacings 153 and 155. All of these spacings are in the first direction. Further the spacing of apertures 152 may vary in a second direction. For example, the apertures 152 are shown with a first spacing 151, 156 and 158 all of which differ and all of which therefore vary row spacing of the array 154.

Thus, one skilled in the art will appreciate that, regarding these embodiments, the arrays 154 of apertures 152 may be formed in uniform or non-uniform manner or a combination thereof. It should be understood that non-uniform apertures may form arrays which are arranged in generally uniform spacing. Similarly, the apertures may be uniformly spaced and define arrays which are non-uniform in spacing. Therefore, the spacing of apertures and arrays may or may not be mutually exclusive. Still further, the apertures 152 may be formed of same or varying sizes and cross-sectional areas as previously described.

The foregoing description of structures and methods has been presented for purposes of illustration. It is not intended to be exhaustive or to limit the invention to the precise steps and/or forms disclosed, and obviously many modifications and variations are possible in light of the above teaching.

Features described herein may be combined in any combination. Steps of a method described herein may be performed in any sequence that is physically possible. It is understood that while certain embodiments of methods and materials have been illustrated and described, it is not limited thereto and instead will only be limited by the claims, appended hereto.

While multiple inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the invent of embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Examples are used to disclose the embodiments, including the best mode, and also to enable any person skilled in the art to practice the apparatus and/or method, including making and using any devices or systems and performing any incorporated methods. These examples are not intended to be exhaustive or to limit the disclosure to the precise steps and/or forms disclosed, and many modifications and variations are possible in light of the above teaching. Features described herein may be combined in any combination. Steps of a method described herein may be performed in any sequence that is physically possible.

All definitions, as defined and used herein, should be understood to control over dictionary definitions, definitions in documents incorporated by reference, and/or ordinary meanings of the defined terms. The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. An engine component assembly for impingement cooling, comprising:
   an engine component having a cooled surface;
   said engine component having a cooling flow path on one side of said cooled surface;
   an insert adjacent to said engine component cooled surface, said insert having a plurality of openings forming an array through said insert, said cooling flow path passing through said plurality of openings to cool said cooled surface; and
   a gap between said engine component and said insert;
   wherein said plurality of openings extend through said insert at a non-orthogonal angle with at least one outer surface of said insert, said plurality of openings defining an aperture length-to-diameter ratio,
   wherein said aperture length-to-diameter ratio is between about 1 and about 10,
   wherein each non-orthogonal angle is less than about 90 degrees and greater than about 0 degrees, and
   wherein the array through said insert defines a plane within the at least one outer surface of said insert such that each opening of the plurality of openings falls within the plane and is spaced apart in both a first direction and a second direction from at least one other opening of said plurality of openings.

2. The engine component of claim 1, said engine component being at least one of a first stage nozzle, a second stage nozzle, a shroud, a blade, a combustor liner, and a combustor deflector.

3. The engine component of claim 1 further comprising an airfoil, an inner band and an outer band.

4. The engine component of claim 3, wherein said airfoil is at least partially hollow.

5. The engine component of claim 1, said insert being at least partially hollow.

6. The engine component of claim 1, said insert extending completely about an inner perimeter of said engine component.

7. The engine component of claim 1, said plurality of openings being a single size.

8. The engine component of claim 1, said plurality of openings being various sizes.

9. The engine component of claim 1, said plurality of openings being at least one shape.

10. The engine component of claim 1, said plurality of openings being multiple shapes.

11. The engine component of claim 1, said plurality of openings being uniformly spaced apart.

12. The engine component of claim 1, said plurality of openings having various spacings therebetween.

13. The engine component of claim 1 wherein said plurality of openings are aligned in the direction of an axis of said openings.

14. The engine component of claim 1 wherein said plurality of openings are staggered relative to an axis of said openings.

15. The engine component of claim 1, each of said angle being the same.

16. The engine component of claim 1, one or more of said angle differing.

17. The engine component of claim 1, said angle being between about 25 degrees and about 65 degrees.

18. The engine component of claim 1, wherein a ratio of the impingement jet average fluid velocity tangent to the cooled surface, to the impingement jet average fluid velocity normal to the cooled surface is between 0.5 and 2.

19. An engine component assembly for impingement cooling, comprising:
an engine component having a cooled surface, said engine component being at least one of a first stage nozzle, a second stage nozzle, a shroud, a blade, a combustor liner, and a combustor deflector;
said engine component having a cooling flow path on one side of said cooled surface;
an insert adjacent to said engine component cooled surface, said insert having a plurality of openings forming an array through said insert, said cooling flow path passing through said plurality of openings to cool said cooled surface;
a gap between said engine component and said insert; and,
said plurality of openings extending through said insert at a non-orthogonal angle to a surface of said insert and defining an aperture length-to-diameter ratio,
wherein said aperture length-to-diameter ratio is between about 1 and about 5,
wherein a ratio of the impingement jet average fluid velocity tangent to the cooled surface, to the impingement jet average fluid velocity normal to the cooled surface is between 0.5 and 2, and
wherein each non-orthogonal angle is less than about 90 degrees and greater than about 0 degrees, and
wherein the array through said insert defines a plane within the at least one outer surface of said insert such that each opening of the plurality of openings falls within the plane and is spaced apart in both a first direction and a second direction from at least one other opening of said plurality of openings.

20. The engine component assembly of claim 19, said array further comprising;
a first plurality of apertures placed apart a first distance;
a second plurality of apertures placed apart a second distance; and
a third plurality of apertures placed apart a third distance,
wherein the first plurality of apertures, the second plurality of apertures, and the third plurality of apertures are placed apart in a first direction,
wherein the second distance is greater than the first distance, and
wherein the third distance is greater than the second distance.

21. The engine component assembly of claim 20, said array further comprising;
a fourth plurality of apertures placed apart a fourth distance; and
a fifth plurality of apertures placed apart a fifth distance,
wherein the fourth plurality of apertures and the fifth plurality of apertures are placed apart in a second direction, and
wherein the fifth distance is greater than the fourth distance.

22. The engine component assembly of claim 21, said array further comprising;
a sixth plurality of apertures placed apart a sixth distance,
wherein the sixth plurality of apertures are placed apart in a second direction, and
wherein the sixth distance is greater than the fifth distance.

23. The engine component assembly of claim 22 wherein the ratio of the impingement jet average fluid velocity tangent to the cooled surface, to the impingement jet average fluid velocity normal to the cooled surface is between 0.5 and 1.5.

24. The engine component assembly of claim 23 wherein the ratio of the impingement jet average fluid velocity tangent to the cooled surface, to the impingement jet average fluid velocity normal to the cooled surface is between about 0.5 and about 1.0, and
wherein the plurality of openings comprises more than one shape.

25. An engine component assembly, comprising:
an engine component having a cooled surface and having a cooling flow path on one side of said cooled surface;
an insert adjacent to said engine component cooled surface, said insert having a plurality of openings through said insert at a non-orthogonal angle to a surface of said insert, said plurality of openings forming an array through said insert and defining an aperture length-to-diameter ratio, said cooling flow path passing through said plurality of openings toward said cooled surface; and
a gap between said engine component and said insert,
wherein said aperture length-to-diameter ratio is between about 1 and about 2.5, and
wherein each non-orthogonal angle is less than about 90 degrees and greater than about 0 degrees, and
wherein the array through said insert defines a plane within the at least one outer surface of said insert such that each opening of the plurality of openings falls within the plane and is spaced apart in both a first direction and a second direction from at least one other opening of said plurality of openings.

26. The engine component of claim 25, said engine component being at least one of a first stage nozzle, a second stage nozzle, a shroud, a blade, a combustor liner, and a combustor deflector.

27. The engine component of claim 25 further comprising an airfoil, an inner band, and an outer band.

28. The engine component of claim 27, wherein said airfoil is at least partially hollow.

29. The engine component of claim 25, said insert being at least partially hollow and extending completely about an inner perimeter of said engine component.

* * * * *